April 30, 1968 D. L. WALLEN 3,381,285

SERRATED RECORD DISC WITH INTERNALLY GENERATED AIR PRESSURE

Filed March 17, 1965 2 Sheets-Sheet 1

INVENTOR

DAVID L. WALLEN

BY [signature]

ATTORNEY

April 30, 1968 D. L. WALLEN 3,381,285

SERRATED RECORD DISC WITH INTERNALLY GENERATED AIR PRESSURE

Filed March 17, 1965 2 Sheets-Sheet 2

United States Patent Office 3,381,285

Patented Apr. 30, 1968

3,381,285

SERRATED RECORD DISC WITH INTERNALLY GENERATED AIR PRESSURE

David L. Wallen, Van Nuys, Calif., assignor to General Precision Systems Inc., a corporation of Delaware Filed Mar. 17, 1965, Ser. No. 440,581

9 Claims. (Cl. 340—174.1)

ABSTRACT OF THE DISCLOSURE

A magnetic disc memory construction in which flying read/record heads are urged toward the recording surface of the disc by pneumatic pressure, created by the pumping action of the disc. The flying magnetic heads are supported by springs which urge them away from contact with the surface of the disc when the latter is rotating at less than operating speed.

This invention relates to a dynamic storage and retrieval system and, more particularly, to an improved magnetic memory system of a digital computer or the like employing magnetic transducers which are mounted in proximity to the surface of the recording medium.

In the magnetic memory system art, transducers are now designed to float on a cushion of air which maintains a spaced relationship between the transducer and the rotating recording medium and, in this particular instance, one such recording medium is a magnetic memory disc. The cushion of air between the head and the disc prevents the two from actually colliding due to run-out, or disc "wobble." These types of transducers are commonly called "flying heads" and will be referred to here as such.

As the recording medium or disc is rotated, a laminar air flow is created on the surfaces of the disc. The flying head, which normally consists of a magnetic read/record element encased within a flat housing, normally is called throughout the art a "shoe." As the disc rotates, the laminar air flow will cause the shoe to be maintained at a specific distance from the surface of the disc. Normally, a leaf spring, or the like, is used to force the shoe toward the surface of the disc, and a balance is created between the lift imparted by laminar air flow and the force exerted by the spring to maintain the spaced relationship between the shoe and disc.

The principal object of such devices is to keep the recording portion of the shoe as close to the recording surface of the disc as possible. This will enable a stronger readout signal and also will increase the number of bits per inch that may be recorded. Co-pending applications "Spring Mounted Head for Disc Memory," Ser. No. 198,894 filed May 31, 1962, on behalf of John A. Felts and "Flying Head," Ser. No. 331,509 filed Dec. 18, 1963, on behalf of John A. Felts, describe such memory systems using flying heads. Application Ser. No. 198,894 is now Patent No. 3,177,495, granted Apr. 6, 1965; and application Ser. No. 331,509 is now Patent No. 3,197,751, granted July 27, 1965.

Heretofore, numerous means using flying heads have been devised to regulate spacing between the head and the disc. Each of these means has met with only limited success. One such means is to mount the head within the shoe on a leaf spring, with its tension adjustable to maintain a specific distance off the disc while the disc is rotating at its optimum speed. A disadvantage of such a device is that when the disc is rotating appreciably below this optimum speed or is stopped, the head and shoe will be in contact with or rest upon the surface of the disc. This will in some cases either score the disc or put considerable wear upon the head recording surface.

Briefly described, this invention provides a dynamic storage system having flying heads associated therewith and supported away from the disc surface by spring biasing. The disc is serrated to provide an internally generated air pressure that is conducted through a plurality of air passageways to each head. This air pressure is then used to overcome the spring biasing means and the laminar air flow and forces the shoe toward the surface of the disc. Means are provided in the air passageway leading to each shoe to regulate the amount of air flow and thus adjust the distance between the flying head and the disc.

It, therefore, becomes one object of this invention to provide a novel and improved magnetic memory system having flying heads which never touch the surface of the dynamic storage medium.

Another object of this invention is to provide a novel and improved magnetic memory system with flying heads which operate closer to the surface of the disc of the storage medium, by means of controlled air pressure internally generated within the memory system.

Another object of this invention is to provide a novel and improved magnetic memory system wherein a specific spatial relationship is maintained between the disc surface whenever the rotational speed of the disc varies.

Other objects will become apparent when taken into consideration with the following drawings in which.

Figure 1:
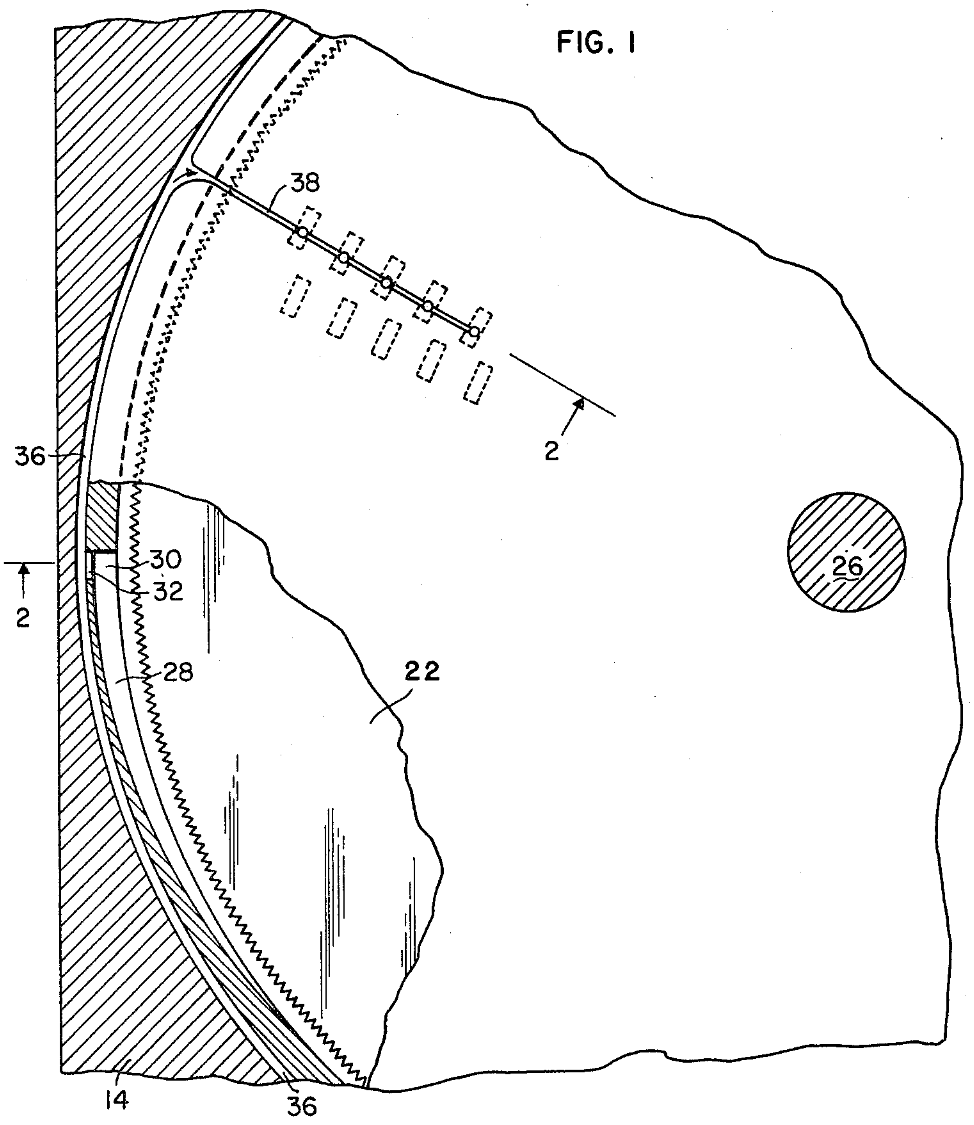
FIGURE 1 is a top view, partially in section, of one embodiment of this invention, showing a dynamic memory system with the top cover removed to reveal the internal mechanism taken along the line 1—1 of FIGURE 2.
Figure 2:
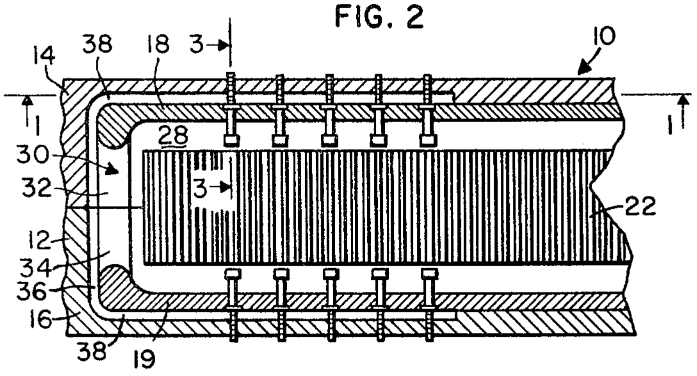
FIGURE 2 is an enlarged partial section view of FIGURE 1, taken along the line 2—2 of FIGURE 1.

Turning now to a more detailed description of one embodiment of this invention, and referring to the drawings, FIGURES 1 and 2 collectively, the memory system 10 consists of a housing 12 which is normally of two portions, an upper cover 14 and a lower cover 16. Upper cover 14 and lower cover 16 are secured together by any suitable means (not shown) to form an air chamber. A pair of shoe mounting plates 18 and 19 are positioned adjacent housing 12 and surrounding the rotating memory disc 22, a plurality of shoes or flying heads 20 are secured to shoe mounting plates 18 and 19. A shaft 26 is provided for rotating memory disc 22.

A cavity which forms air chamber 28 is formed between the confines of the shoe mounting plates 18 and 19. Memory disc 22 is rotatably disposed between plates 18 and 19 and has a serrated periphery, so that as it rotates it causes a centrifugal air flow from its outer periphery. The walls of shoe mounting plates 18 and 19 extend past the periphery of memory disc 22 and are coupled together to completely surround disc 22 as previously stated. At specific locations 30 air pockets 32 are formed to receive the air flow from the serrated periphery of memory disc 22. Therefore, as the disc 22 rotates, forcing air away from its periphery, these pockets 32 capture this air. openings 34 are provided from the air pockets 32 to let the air escape into a main air passage 36. This main air passageway is formed between shoe mounting plates 18 and 19 and housing 12 as shown in FIGURES 1 and 2.

Leading from the main air passageway 36 are a number of smaller air passageways 38, branched as necessary and leading to each group of shoes 20.

Figure 3:
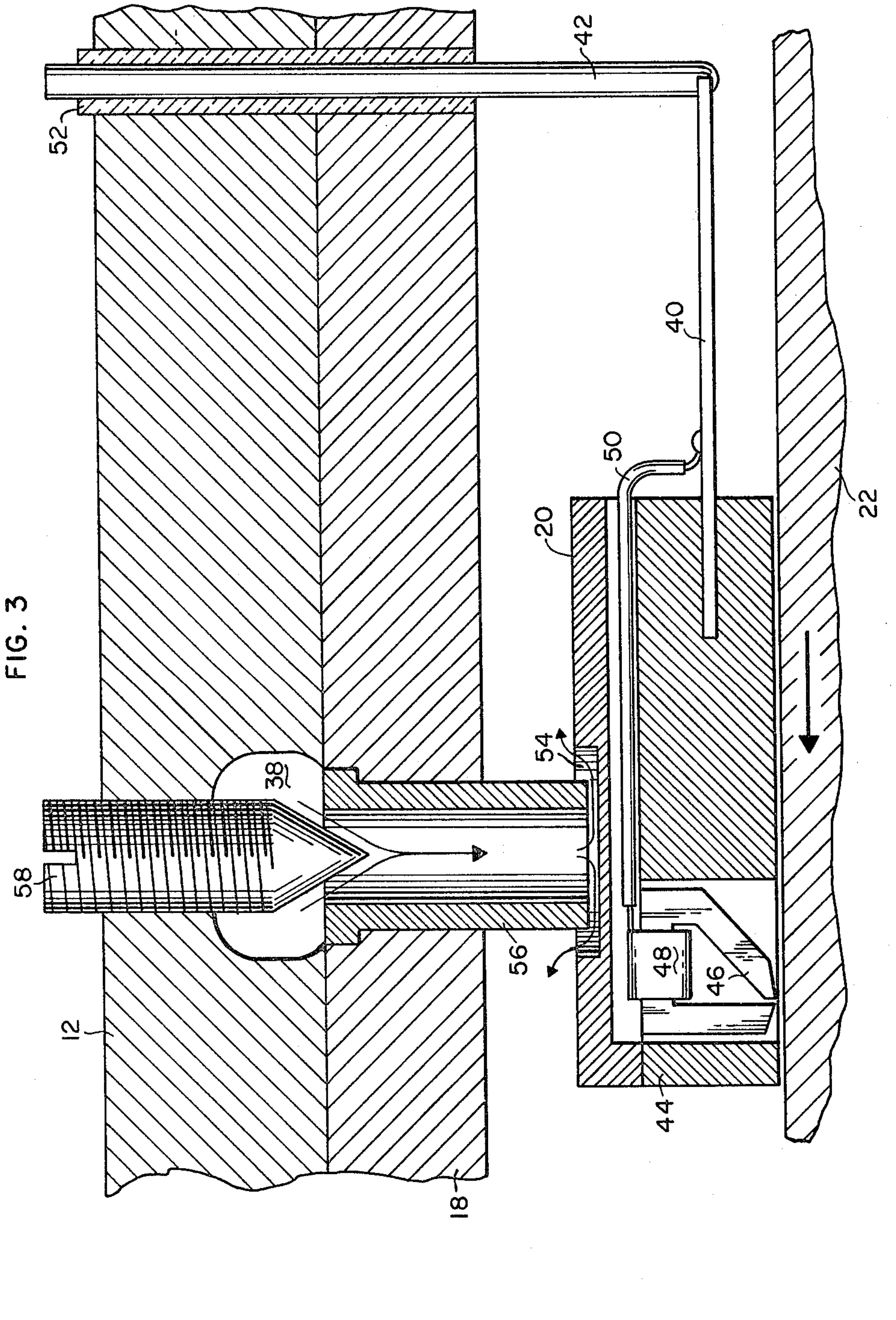
FIGURE 3 is an enlarged partial section taken along the line 3—3 of FIGURE 2.

Referring now to FIGURE 3, there is shown in detail a shoe 20 as it is positioned over the recording surface of memory disc 22. Shoe 20 is affixed to shoe mounting plate 18, for example, by resilient leaf springs 40. Each spring 40 is coupled directly to a terminal post 42 and the spring is biased to urge the shoe away from the surface of the disc. The leaf spring 40 also acts as a conductor for the readout head 44 which consists of a read/record head core 46 that has a winding 48 thereon. This head core represents the typical readout element that is well known in the art. Output leads 50 from readout coil 48 are soldered, for instance, directly onto leaf springs 40. Termanal post 42 extends through the shoe mounting plate 18 and housing 12 for connecting into external circuitry. An insulated sleeve 52 is provided to keep terminal post 42 from making physical electrical contact with either the shoe mounting plate 18 or the housing 12.

A cavity may be cut into the top of the shoe 20 for an insert 56 that leads from the air passageway 38.

As memory disc 22 rotates, air is forced into pocket 32 and into main air passageway 36 through openings 34. The air then continues through the smaller air passageway and into inserts 56 and bears upon the cavity 54 in the shoe 20, thereby overcoming the biasing of leaf springs 40, forcing the shoe closer to the surface of the memory disc 22.

The amount of air that will flow through the insert 56 may be regulated by a needle valve set screw 58, which extends into the insert 56. If the needle valve set screw 58 is screwed down, it decreases the air flow and, if screwed out, the air flow to shoe 20 will increase. This air flow is then regulated to overcome the biasing of resilient springs 40 and also overcome the laminar air flow that is generated on the surface of the rotating memory disc 22.

By this invention, a unique way has been developed to maintain the distance between the surface of disc 22 and shoe 20. If memory disc 22 speeds up, the laminar air flow on the surface of the disc increases, tending to put more lift on the shoe 20, but as the disc 22 speed increases, so does the centrifugal air flow generated from the serrated periphery of the memory disc 22 through the air passageways causing increased air pressure into the cavity 54 of the shoe 20, thereby counteracting the opposing force of the laminar air flow. Thus, the spaced relationship between the shoe 20 and the rotating memory disc 22 remains the same. Likewise, should the speed of disc 22 decrease, the laminar flow decreases and the air pressure upon the tops of the shoes 20 decreases accordingly.

What is claimed is:

1. A data storage and retrieval system for recording and reading digitally coded data on a dynamic storage medium comprising: a rotating magnetic memory disc having digitally coded data stored thereon in discrete circular tracks, said rotating disc carrying flow-inducing means at its periphery to generate a flow of ambient gaseous medium under pressure, at least one read/recording means for each said discrete circular track disposed adjacent to and biased from said memory disc, and means for adapting the gaseous pressure generated by said memory disc to overcome the biasing means of said read/recording means closer to said disc.

2. A data storage and retrieval system, as set forth in claim 1, including a means for regulating said gaseous flow to said read/record head.

3. A dynamic memory system comprising: a housing having a plurality of inlets, a rotatable memory disc encased in said housing, said disc being serrated to centrifugally create an air flow into said inlets in said housing when said disc is rotating, a plurality of transducers positioned to read and record data on said disc, and a plurality of air passageways in said housing for directing said air flow from said inlets to cavities in said transducers and for forcing said transducers closer to said disc.

4. A dynamic memory system comprising: a housing having a plurality of inlets, a rotatable memory disc encased in said housing capable of storing data thereon in discrete circumferential tracks, said disc being serrated on its outer periphery creating an air flow into said inlets when said disc is rotating, a plurality of transducers positioned to read and record said data on said disc, spring biasing means for urging said transducers away from said disc, and a plurality of air passageways in said housing for directing said air flow from said inlets to said transducers and for forcing said transducers closer to said disc.

5. A dynamic memory system comprising: a housing having a plurality of inlets, a rotatable memory disc encased in said housing capable of storing data thereon in discrete circumferential tracks, said disc having a serrated edge for centrifugally creating an air flow into said inlets when said disc is rotating, a plurality of transducers positioned to read and record said data on said disc, each said transducer having a top portion with a cylindrical cavity therein, spring biasing means for urging said transducers away from said disc, and a plurality of air passageways in said housing for directing said air flow from said inlets to said cavities in said transducers and for forcing said transducers closer to said disc.

6. A dynamic memory system, as set forth in claim 5, including a plurality of hollow inserts in said passageways and protruding into said cavities in said transducers.

7. A dynamic memory system, as set forth in claim 5, including a plurality of hollow inserts in said passageways and protruding into said cavities in said transducers and a needle valve for extending into each said insert for regulating the air flow through said inserts.

8. A dynamic memory system, as set forth in claim 5, including means for regulating the amount of air flow in said passageway.

9. A dynamic memory system, as set forth in claim 8, wherein said means for regulating the amount of air flow in said passageway is a plurality of needle valves positioned to regulate the air flow in said passageways.

References Cited

UNITED STATES PATENTS 2,937,240 5/1960 Harker ---------- 340—174.1

FOREIGN PATENTS 210,582 8/1955 Australia.

BERNARD KONICK, *Primary Examiner.*

V. P. CANNEY, *Assistant Examiner.*